United States Patent
Scholz et al.

(10) Patent No.: US 10,130,182 B2
(45) Date of Patent: Nov. 20, 2018

(54) LAYERED STRUCTURE FOR A SEAT CUSHION

(71) Applicant: J.H. Ziegler GmbH, Achern (DE)

(72) Inventors: Julia Scholz, Achern-Oberachern (DE); Steffi Schoenfelder, Sasbach (DE)

(73) Assignee: J.H. Ziegler GmbH, Achern (DE)

( * ) Notice: Subject to any disclaimer, the term of this patent is extended or adjusted under 35 U.S.C. 154(b) by 297 days.

(21) Appl. No.: 13/955,436

(22) Filed: Jul. 31, 2013

(65) Prior Publication Data
US 2014/0035342 A1  Feb. 6, 2014

(30) Foreign Application Priority Data
Aug. 3, 2012  (DE) .................. 20 2012 007 510 U

(51) Int. Cl.
| | |
|---|---|
| *B32B 5/02* | (2006.01) |
| *B32B 5/24* | (2006.01) |
| *B60N 2/58* | (2006.01) |
| *A47C 7/24* | (2006.01) |
| *B68G 11/02* | (2006.01) |
| *A47C 31/00* | (2006.01) |

(52) U.S. Cl.
CPC ............. *A47C 7/24* (2013.01); *A47C 31/006* (2013.01); *B32B 5/022* (2013.01); *B32B 5/026* (2013.01); *B32B 5/24* (2013.01); *B60N 2/58* (2013.01); *B68G 11/02* (2013.01); *Y10T 428/2495* (2015.01); *Y10T 442/3537* (2015.04); *Y10T 442/45* (2015.04); *Y10T 442/488* (2015.04); *Y10T 442/494* (2015.04)

(58) Field of Classification Search
CPC .......... B60N 2/58; B68G 11/02; A47C 31/006
USPC .......................................................... 442/319
See application file for complete search history.

(56) References Cited

U.S. PATENT DOCUMENTS

| | | | | |
|---|---|---|---|---|
| 4,350,727 A | * | 9/1982 | Wald | A41D 31/02 |
| | | | | 112/440 |
| 5,236,770 A | * | 8/1993 | Assent | B32B 5/10 |
| | | | | 2/272 |
| 5,747,393 A | * | 5/1998 | Eckel | B32B 5/26 |
| | | | | 442/247 |
| 6,630,414 B1 | * | 10/2003 | Matsumoto | A47C 31/006 |
| | | | | 428/114 |

(Continued)

FOREIGN PATENT DOCUMENTS

| | | | |
|---|---|---|---|
| DE | 10 2010 019 886 A1 | 12/2010 | |
| FR | 2916166 A1 * | 11/2008 | ............... B60N 2/58 |

OTHER PUBLICATIONS

Zwick, Kenneth and Martha Tat. Facial Tissue, Encyclopedia of Tribology, p. 1001-1006 (2013).*

(Continued)

*Primary Examiner* — Peter Y Choi
*Assistant Examiner* — Jennifer A Gillett
(74) *Attorney, Agent, or Firm* — Posz Law Group, PLC

(57) ABSTRACT

A seat cushion having a layered structure including at least a surface layer unit and a cushion layer unit disposed below the surface layer unit, characterized in that the cushion layer unit includes at least one nonwoven layer and at least one spacer crocheted-fabric and/or spacer knitted-fabric layer. A seat cushion of a seating furniture or an automobile seat or an office seating furniture or an aircraft seat are exemplary embodiments of the seat cushion mentioned above.

11 Claims, 1 Drawing Sheet

(56) References Cited

U.S. PATENT DOCUMENTS

| | | | |
|---|---|---|---|
| 2003/0160479 A1* | 8/2003 | Minuth | B60N 2/5635 297/180.14 |
| 2003/0168118 A1* | 9/2003 | Metzger | A41B 11/005 139/421 |
| 2003/0230913 A1* | 12/2003 | Buss | B60N 2/5635 297/180.14 |
| 2005/0016546 A1* | 1/2005 | Pohlman | A61F 6/06 128/844 |
| 2005/0093347 A1* | 5/2005 | Bajic | B60N 2/5635 297/180.13 |
| 2006/0016572 A1* | 1/2006 | Onikubo et al. | 162/358.2 |
| 2007/0207691 A1* | 9/2007 | Cobbett Wiles et al. | 442/318 |
| 2011/0045724 A1* | 2/2011 | Bahukudumbi | 442/57 |
| 2011/0173757 A1* | 7/2011 | Rensink | A47C 27/04 5/698 |

OTHER PUBLICATIONS

Ramkumar, S.S. and C. Roedel. Study of Needle Pntration Speeds on Frictional Properties of Nonwoven Webs: A New Approach, Journal of Applied Polymer Science, vol. 89, 3626-3631 (2003).*
FR 2916166 English Machine Translation.*
Mougel. Derwent 2008-N92079. Thomas Reuters, Nov. 2008.*
R.Shishoo. Textile Advances in the Automotive Industry, Woodhead Publishing Limited, 2008.*

* cited by examiner

LAYERED STRUCTURE FOR A SEAT CUSHION

CROSS REFERENCE TO RELATED APPLICATION

This application is based on and incorporates herein by reference German Patent Application No. 20 2012 007 510.1 filed on Aug. 3, 2012.

BACKGROUND

The invention relates to a layer structure for a seat cushion and a seat cushion of a seat having a layer structure.

Various designs of a layer structure for a seat cushion are known from the prior art. The layer structure usually consists of a surface layer unit comprising a textile material, leather or synthetic leather which is joined to a cushion layer unit comprising a foam. In order to allow an air-conditioning of the seat cushion and a regulation of the moisture of the seat cushion, air guiding channels and support structures are provided in the cushion layer unit with the result that the seat cushion has a high weight as well as a large thickness.

Known from DE 10 2010 019 886 A1 is a layer structure for a seat cushion at least comprising a surface layer unit and a cushion layer unit disposed below the surface layer unit. The cushion layer unit comprises an air-permeable textile support which is laminated to a layer of air-permeable nonwoven, felt, material, leather or synthetic leather and a thick layer of polyurethane foam located thereunder. The voluminous layer of polyurethane foam comprises air guiding channels having elongate support structures and a foam-impermeable barrier layer facing the air-permeable textile support in order to enable an air-conditioning of the seat surface and a regulation of the moisture of the seat surface.

SUMMARY

It is in particular the object of the invention to provide a layer structure for a seat cushion which allows an improvement in the seating comfort of the seat.

The object is solved according to the invention n by a layer structure for a seat cushion and a seat cushion.

The invention starts from a layer structure for a seat cushion at least comprising a surface layer unit and a cushion layer unit disposed below the surface layer unit. It is proposed that the cushion layer unit comprises at least one nonwoven layer and at least one spacer crocheted-fabric and/or spacer knitted-fabric layer.

An essential advantage of the invention consists in that the cushion layer unit comprises at least one nonwoven layer and at least one spacer crocheted-fabric and/or spacer knitted-fabric layer. In an advantageous manner, a particularly thin layer structure and therefore a light seat cushion can be produced as a result, with a high cushion effect comparable to a foam since the two material layers can be joined particularly easily. Compared to foam, the layer structure according to the invention has a particularly high air permeability with the result that expensive air guiding channels with additional elongate support structures can be dispensed with. As a result, in addition to a substantial simplification and a technical improvement of the layer structure according to the invention, the manufacturing costs, the tool costs and the material costs can be reduced appreciably with the result that the layer structure according to the invention for a seat cushion can be manufactured particularly economically.

In one embodiment of the layer structure at least one nonwoven layer of the cushion layer unit is implemented as a needle-punched nonwoven layer. In an advantageous manner, the nonwoven layer of pure needle-punched nonwoven has very good material properties, with the result that the nonwoven layer can be used for the seat portion and for the rest portion in seats of any type such as, for example, in upholstered furniture, in vehicle seats, in aircraft seats and in office chairs. The nonwoven layer can in particular have a high air permeability, a good drapability and a pleasant sitting-down behavior.

Preferably at least one layer of spacer crocheted fabric and/or spacer knitted fabric is used in the layer structure according to the invention as combination material for the nonwoven layer. In an advantageous manner the spacer crocheted fabric and/or spacer knitted fabric has particularly good material properties with a defined elastic behavior in the longitudinal and transverse direction, which can ideally supplement the material properties of the nonwoven layer. As a result of the very good air permeability, spacer crocheted fabric and/or spacer knitted fabric exhibit a good moisture conductivity and a good thermoregulation. At high thicknesses, spacer crocheted fabric and/or spacer knitted fabric have a high resilience and very good sitting-down properties as a result of their spacer threads. The surface of the spacer crocheted fabric can be configured to be net-like with the result that a very high air permeability and therefore a very good air-conditioning comfort can be ensured. In order to be able to permanently guarantee the thickness of the spacer crocheted fabric and/or spacer knitted fabric, spacer crocheted fabric and/or spacer knitted fabric having high thickness can in particular be designed to be very stiff.

In one embodiment of the layer structure, the at least one spacer crocheted-fabric and/or spacer knitted-fabric layer is disposed below the at least one nonwoven layer and/or the at least one nonwoven layer is disposed below the at least one spacer crocheted-fabric and/or spacer knitted-fabric layer. In an advantageous manner, through a combination of the nonwoven layer and the spacer crocheted-fabric and/or spacer knitted-fabric layer, the positive properties of the two materials can be combined in the cushion layer unit of the layer structure and supplement one another. The cushion layer unit of the layer structure can thereby have a particularly high point elasticity with a high resilience. A further advantage is the particularly good drapability of the cushion layer unit of the layer structure since both the nonwoven layer and also the preferably thin spacer crocheted-fabric and/or spacer knitted-fabric layer can have a good drapability.

In a further embodiment of the invention, the at least one spacer crocheted-fabric and/or spacer knitted-fabric layer is incorporated between two nonwoven layers. Depending on the surface layer unit, the nonwoven layers and the spacer crocheted-fabric and/or spacer knitted-fabric layer having the respective said material properties can thus be disposed in the cushion layer unit as required or matched to the surface layer unit. Since the nonwoven layers surround the spacer crocheted-fabric and/or spacer knitted-fabric layer and therefore the spacer crocheted-fabric and/or spacer knitted-fabric layer has no contact with the surface layer unit, when the seat is used, noise can largely be avoided during sitting down or during movement of a person on the seat.

In a further embodiment of the invention, the at least one nonwoven layer is incorporated between two spacer crocheted-fabric and/or spacer knitted-fabric layers. In this embodiment of the cushion layer unit, a thick material can be produced which nevertheless has a very good resilience.

It is proposed that the layer structure has at least one sliding material layer which is provided at a surface of a nonwoven layer. In one embodiment of the layer structure, the at least one sliding material layer is implemented as a circular knitted material layer or as a charmeuse material layer. In an advantageous manner, during upholstery of the seat cushion onto a seat, a better sliding of the nonwoven layer can thereby be achieved with the result that the application of the layer structure to the seat cushion can be simplified substantially and thus be accomplished more rapidly.

In an advantageous manner the layers of the cushion layer unit can have the same layer thicknesses or different layer thicknesses. As a result, a particularly thin or thick cushion layer unit of the layer structure can be produced having a good resilience, a good pressure relief and a high cushion effect of the seat.

In a further embodiment of the layer structure, at least one nonwoven layer of the cushion layer unit can be applied by adhesive bonding or needling to at least one spacer crocheted-fabric and/or spacer knitted-fabric layer. By this means in an advantageous manner the two layers can be permanently joined together and thereby ensure the cohesion strength between the nonwoven layer and the spacer crocheted-fabric and/or spacer knitted-fabric layer. When joining by adhesive bonding, the adhesive layer can be applied only to partial areas or the entire joining surfaces of the nonwoven layer and/or the spacer crocheted-fabric and/or spacer knitted-fabric layer. In contrast to adhesive bonding in which a substantially all-over joining can be accomplished, when joining by needling between the nonwoven layer and the spacer crocheted-fabric and/or spacer knitted-fabric layer, an open air-permeable structure remains, with the result that a layer structure for a seat cushion thus produced can be used particularly well for air-conditioned seats.

In an advantageous embodiment of the invention, at least one layer of the cushion layer unit consists at least partially of PES (polyester). A substantial advantage of PES plastic is the high mechanical strength and the high stiffness over a wide temperature range, with the result that in particular a pure PES cushion layer unit can have a high dimensional stability. In contrast to conventional seat cushions which usually have a layer structure of different types of materials such as, for example, PUR foam and a nonwoven layer of a polymer, in an advantageous manner in the layer structure according to the invention, a pure combination of the nonwoven layer and the spacer crocheted-fabric and/or spacer knitted-fabric layer of one material can be accomplished. The pure combination in the layer structure can therefore satisfy the end-of-life vehicles directive and design seats suitable for recycling from the outset.

In an advantageous embodiment of the layer structure, the surface layer unit at least partially consists of leather and/or textile material and/or synthetic leather. In an advantageous manner, a high sitting comfort with high air permeability can thereby be achieved. A further advantage of the layer structure according to the invention is that any formation of noise under the surface layer unit can be eliminated with a combination of the at least one nonwoven layer and the at least one spacer crocheted-fabric and/or spacer knitted-fabric layer, in particular when using leather as surface layer unit, since leather has a tendency to noise formation such as, for example, rustling, with an inappropriate choice of material of the cushion layer unit. Furthermore, when using leather as surface layer unit the layer structure according to the invention can be worked on a sewing machine used in leather working.

In a particularly advantageous manner a seat cushion of a seat is implemented with a layer structure according to the invention, where the layer structure according to the invention can be used as a seat cushion of a seating furniture or an automobile seat or an office seating furniture or an aircraft seat.

BRIEF DESCRIPTION OF THE DRAWINGS

Further advantages are obtained from the following description of the drawings. Four exemplary embodiments of the invention are shown in the drawings. The drawings, the description and the claims contain numerous features in combination. The person skilled in the art will expediently also examine the features individually and combine these to appropriate further combinations.

In the figures.

DETAILED DESCRIPTION

FIG. 1 to FIG. 4 show four exemplary embodiments of a layer structure according to the invention for a seat cushion 10*a*; 10*b*; 10*c*; 10*d*. The layer structure comprises at least one surface layer unit 12*a*; 12*b*; 12*c*; 12*d* and a cushion layer unit 14*a*; 14*b*; 14*c*; 14*d* disposed below the surface layer unit 12*a*; 12*b*; 12*c*; 12*d*. The seat cushion 10*a*; 10*b*; 10*c*; 10*d* of a seat having such a layer structure can be implemented as seat cushion 10*a*; 10*b*; 10*c*; 10*d* of a seating furniture or of an automobile seat or of an office seating furniture or of an aircraft seat. High demands are imposed on the seat cushion 10*a*; 10*b*; 10*c*; 10*d*. On the one hand, it should be comfortable and light and have a good moisture conducting function and on the other hand it should not have a thick layer structure.

In order to provide a layer structure for a seat cushion 10a; 10b; 10c; 10d, which allows an improvement in the sitting comfort of the seat, it is proposed according to the invention that the cushion layer unit 14a; 14b; 14c; 14d comprises at least one nonwoven layer 16a; 16b; 16c; 16c'; 16d and at least one spacer crocheted-fabric and/or spacer knitted-fabric layer 18a; 18b; 18c; 18d; 18d'.

In the four exemplary embodiments according to FIG. 1 to FIG. 4, the layer thickness of the at least one nonwoven layer 16a; 16b; 16c; 16c'; 16d can be 1 mm to 10 cm and have a thickness ratio between the at least one spacer crocheted-fabric and/or spacer knitted-fabric layer 18a; 18b; 18c; 18d; 18d' under the at least one nonwoven layer 16a; 16b; 16c; 16c'; 16d of 1:1, where other thickness ratios are also possible.

Figure 1:
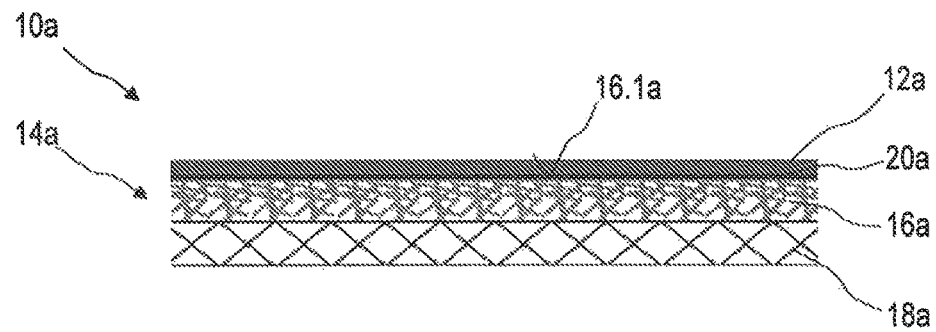
FIG. 1 is a schematic sectional view of a first exemplary embodiment of a layer structure according to the invention comprising a surface layer unit, comprising a sliding material layer located thereunder, comprising a nonwoven layer located thereunder and comprising a spacer crocheted-fabric and/or spacer knitted-fabric layer located thereabove.
Figure 2:
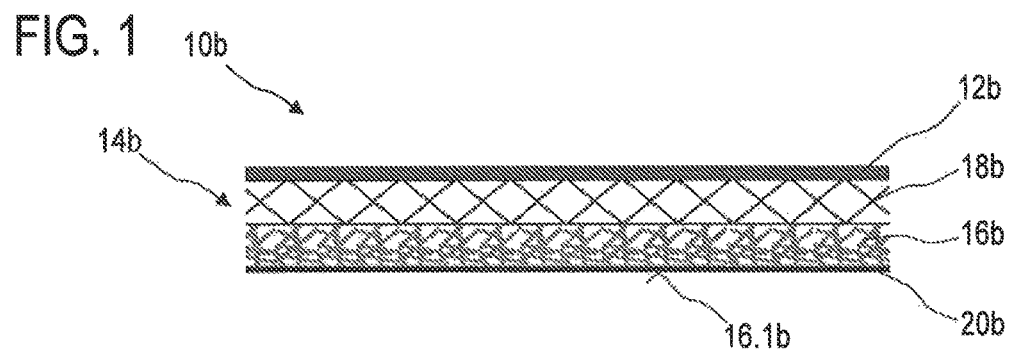
FIG. 2 is a schematic sectional view of a second exemplary embodiment of the layer structure according to the invention comprising the surface layer unit, comprising the spacer crocheted-fabric and/or spacer knitted-fabric layer located thereunder, comprising the nonwoven layer located thereunder and comprising the sliding material layer located thereunder.
Figure 3:
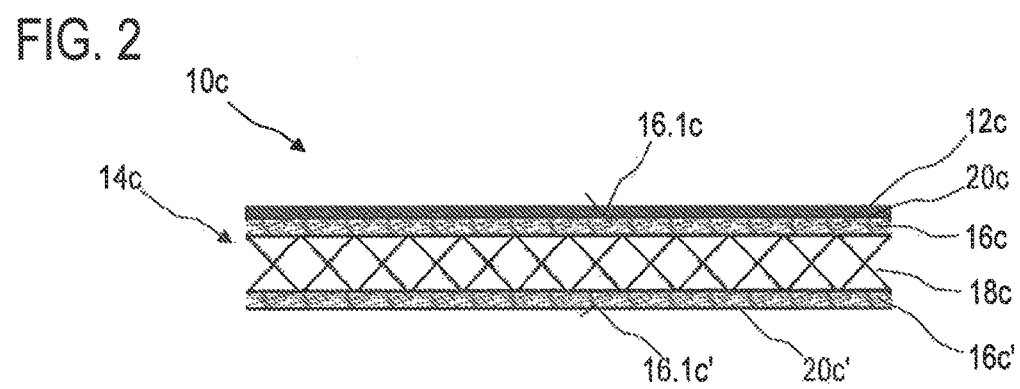
FIG. 3 is a schematic sectional view of a third exemplary embodiment of the layer structure according to the invention comprising the surface layer unit, comprising the sliding material layer located thereunder, comprising the nonwoven layer located thereunder and comprising the spacer crocheted-fabric and/or spacer knitted-fabric layer located thereunder, comprising the nonwoven layer located thereunder and comprising the sliding material layer located thereunder
Figure 4:
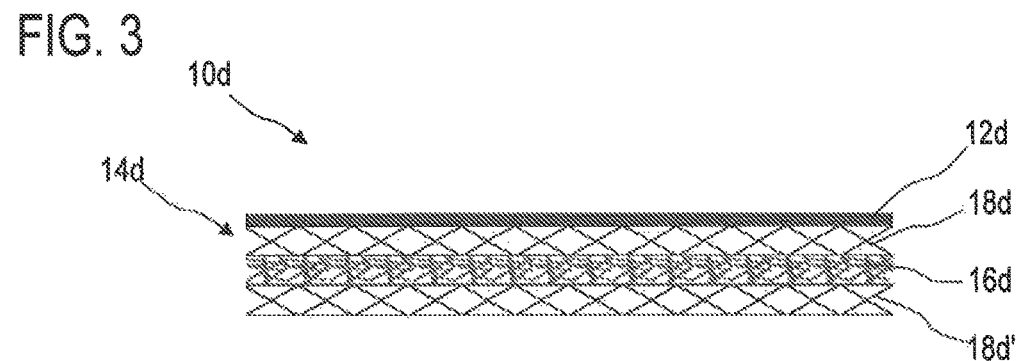
FIG. 4 is a schematic sectional view of a fourth exemplary embodiment of the layer structure according to the invention comprising the surface layer unit, comprising the spacer crocheted-fabric and/or spacer knitted-fabric layer located thereunder, comprising the nonwoven layer located thereunder and comprising the spacer crocheted-fabric and/or spacer knitted-fabric layer located thereunder.

As can be seen from FIG. 1, in the first exemplary embodiment the at least one spacer crocheted-fabric and/or spacer knitted-fabric layer 18a is disposed below the at least one nonwoven layer 16a and in the second exemplary embodiment according to FIG. 2, the at least one nonwoven layer 16b is disposed below the at least one spacer crocheted-fabric and/or spacer knitted-fabric layer 18b. The two layers 16a, 16b, 18a, 18b can be joined to one another by laminating in order to thus achieve a summation of favorable material properties by applying a layer of the other material having the desired properties to the one material.

Alternatively to the first and second exemplary embodiment, the positive properties of one of the two layers can be particularly intensified or the property of one layer can be restricted by using one of the layers twice in one layer structure. In the third exemplary embodiment according to FIG. 3, the at least one spacer crocheted-fabric and/or spacer knitted-fabric layer 18c is incorporated between two nonwoven layers 16c; 16c' and in the fourth exemplary embodiment according to FIG. 4, the at least one nonwoven layer 16d is incorporated between two spacer crocheted-fabric and/or spacer knitted-fabric layers 18d; 18d'. In the fourth exemplary embodiment a thick material can be produced which nevertheless has a very good resilience. Both in the third and in the fourth exemplary embodiment it is feasible to configure one of the two spacer crocheted-fabric and/or spacer knitted-fabric layers 18c; 18d; 18d' or one of the two nonwoven layers 16c; 16c'; 16d to be thicker.

In the exemplary embodiments shown the layers 14a; 14b; 14c; 14d; 16a; 16b; 16c; 16c'; 16d of the cushion layer 14a; 14b; 14c; 14d can have the same or different layer thicknesses.

In order that a better sliding of the nonwoven layers 16a; 16b; 16c; 16c' is possible during upholstering of the seating accommodation, at least one sliding material 20a; 20b; 20c; 20c' is provided which is disposed on a surface 16.1a; 16.1b; 16.1c; 16.1c' of a nonwoven layer 16a; 16b; 16c; 16c'. In the first exemplary embodiment according to FIG. 1 the sliding material 20a is disposed on the surface 16.1a of the nonwoven layer 16a between the nonwoven layer 16a and the surface layer unit 12a. In the second exemplary embodiment according to FIG. 2 the sliding material layer 20b is disposed on the surface 16.1b of the nonwoven layer 16b. In the third exemplary embodiment according to FIG. 3 the sliding material layer 20c; 20c' is disposed on the surface 16.1c; 16.1c' of the nonwoven layer 16c; 16c', where the sliding material layer 20c is disposed between the nonwoven layer 16c and the surface layer unit 12c. Preferably the at least one sliding material layer 20a; 20b; 20c; 20c' is implemented as a circular knitted material layer or as a charmeuse material layer, where however other sliding material layers 20a; 20b; 20c; 20c' which seem appropriate to a person skilled in the art are also feasible.

In an advantageous manner the at least one nonwoven layer 16a; 16b; 16c; 16c'; 16d of the cushion layer unit 14a; 14b; 14c; 14d is implemented as a needle-punched nonwoven layer.

In order to ensure a permanent joint and cohesion strength between the nonwoven layer 16a; 16b; 16c; 16c'; 16d and the spacer crocheted-fabric and/or spacer knitted-fabric layer 18a; 18b; 18c; 18d; 18d'. at least one nonwoven layer 16a; 16b; 16c; 16c'; 16d of the cushion layer unit 14a; 14b; 14c; 14d can be applied by adhesive bonding or needling to at least one spacer crocheted-fabric and/or spacer knitted-fabric layer 18a; 18b; 18c; 18d; 18d'. In an advantageous manner pure adhesive substances can also be used as adhesive, with the result that a homogeneous cushion layer unit 14a; 14b; 14c; 14d can be produced. The type and quantity of the adhesive substance to be used and the size of the area to be joined are substantially determined by the area of usage of the seat cushion 10a; 10b; 10c; 10d. Alternatively suitable as consolidation methods, also called bonding, is the mechanical method by needling or needle-punching.

Since at least one layer 14a; 14b; 14c; 14c'; 14d; 16a; 16b; 16c; 16d; 16d' of the cushion layer unit 14a; 14b; 14c; 14d consists at least partially of PES (polyester), the two layers 14a; 14b; 14c; 14c'; 14d; 16a; 16b; 16c; 16d; 16d' can be simply joined to one another.

The surface layer unit 12a; 12b; 12c; 12d of the seat cushion 10a; 10b; 10c; 10d of the seat can consist at least partially of leather and/or textile material and/or synthetic leather.

The invention claimed is:

1. A seat cushion having a layered structure comprising:
a surface layer unit;
a cushion layer unit disposed below the surface layer unit; and
a sliding material, wherein the surface layer unit comprises leather, textile material, synthetic leather, or a combination thereof,
the cushion layer unit comprises a nonwoven and a spacer fabric, the spacer fabric is a spacer crocheted-fabric or a spacer knitted-fabric or a combination thereof, the nonwoven is a needle-punched nonwoven, the spacer fabric is disposed below the nonwoven in a direction from the surface layer unit to the cushion layer unit,
the spacer fabric is directly connected to the nonwoven,
the sliding material is a charmeuse material, the sliding material is disposed between the surface layer unit and the nonwoven,
the sliding material is directly connected to the nonwoven,
the sliding material is directly contacting the surface layer unit,
the spacer fabric directly abuts on a surface of the nonwoven that is facing the spacer fabric,
the sliding material directly abuts on both a surface of the surface layer unit that is facing the sliding material and an entire surface of the nonwoven that is facing the sliding material, and
the nonwoven of the cushion layer unit is attached by adhesive bonding in which an adhesive is located only on partial areas of the nonwoven, or by needling to the spacer crocheted-fabric and/or the spacer knitted-fabric.

2. The seat cushion according to claim 1, wherein the nonwoven and the spacer fabric have the same thicknesses or different thicknesses.

3. The seat cushion according to claim 1, wherein the nonwoven or the spacer fabric comprises polyester.

4. The seat cushion according to claim 1, comprising an embodiment as a seat cushion of a seating furniture or an automobile seat or an office seating furniture or an aircraft seat.

5. A seat cushion having a layered structure comprising:
a surface layer unit;
a cushion layer unit disposed below the surface layer unit; and
a sliding material, wherein
the surface layer unit comprises leather, textile material, synthetic leather, or a combination thereof,
the cushion layer unit comprises a nonwoven and a spacer fabric, the spacer fabric is a spacer crocheted-fabric or a spacer knitted-fabric or a combination thereof,
the spacer fabric is directly connected to the surface layer unit,
the nonwoven is disposed below the spacer fabric in a direction from the surface layer unit to the cushion layer unit,
the nonwoven is directly connected to the spacer fabric,
the nonwoven is a needle-punched nonwoven,
the sliding material is disposed below the nonwoven in a direction from the surface layer unit to the cushion layer unit,
the sliding material is a charmeuse material,
the sliding material is directly connected to the nonwoven,
the spacer fabric directly abuts on a surface of the surface layer unit that is facing the spacer fabric,
the nonwoven directly abuts on a surface of the spacer fabric that is facing the nonwoven,
the sliding material directly a buts on a surface of the nonwoven that is facing the sliding material, and
the nonwoven of the cushion layer unit is attached by adhesive bonding in which an adhesive is located only on partial areas of the nonwoven, or by needling to the fabric.

6. The seat cushion according to claim 5, wherein the nonwoven or the spacer fabric comprises polyester.

7. The seat cushion according to claim 5, comprising an embodiment as a seat cushion of a seating furniture or an automobile seat or an office seating furniture or an aircraft seat.

8. A seat cushion having a layered structure comprising:
a surface layer unit;
a cushion layer unit disposed below the surface layer unit; and
a sliding material, wherein
the surface layer unit comprises leather, textile material, synthetic leather, or a combination thereof,
the cushion layer unit comprises a nonwoven and a spacer fabric, the spacer fabric is a crocheted-fabric or a spacer knitted-fabric, or a combination thereof, and further comprising a second nonwoven,
the spacer fabric is disposed between the nonwoven and the second nonwoven in a direction from the surface layer unit to the cushion layer unit,
the spacer fabric is directly connected to the nonwoven and the second nonwoven,
the nonwoven is a needle-punched nonwoven,
the sliding material in the direction from the surface layer unit to the cushion layer unit is disposed on top of the nonwoven,
the sliding material is a charmeuse material,
the sliding material is disposed between the surface layer unit and the nonwoven,
the sliding material is directly connected to the nonwoven,
the sliding material is directly contacting the surface layer unit,
the spacer fabric directly abuts on both a surface of the nonwoven that is facing the spacer fabric and a surface of the second nonwoven that is facing the spacer fabric,
the sliding material directly abuts on both a surface of the surface layer unit that is facing the sliding material and a surface of the nonwoven that is facing the sliding material, and
the nonwoven and the second nonwoven of the cushion layer unit are attached by adhesive bonding in which an adhesive is located only on partial areas of the nonwoven and the second nonwoven, or by needling to the spacer fabric.

9. The seat cushion according to claim 1, wherein the nonwoven and the spacer fabric consists of 100% of polyester.

10. The seat cushion according to claim 1, wherein a surface of the spacer fabric is configured to be permeable to air.

11. The seat cushion according to claim 1, wherein a thickness of the nonwoven is 1 mm to 10 cm and has a thickness ratio between the spacer fabric and the nonwoven of 1:1.

* * * * *